US006139951A

United States Patent [19]

Chen et al.

[11] Patent Number: 6,139,951

[45] Date of Patent: Oct. 31, 2000

[54] MAGNETIC RECORDING MEDIUM WITH LOW TEMPERATURE SEEDLAYER FOR HIGH SIGNAL-TO-NOISE RATIO

[75] Inventors: Qixu Chen, Milpitas; Xing Song, Mountain View; Charles Leu, Fremont; Rajiv Ranjan, San Jose, all of Calif.

[73] Assignee: Seagate Technology LLC, Scotts Valley, Calif.

[21] Appl. No.: 09/188,683

[22] Filed: Nov. 10, 1998

Related U.S. Application Data

[60] Provisional application No. 60/069,574, Dec. 12, 1997, abandoned.

[51] Int. Cl.[7] .......... G11B 5/66

[52] U.S. Cl. .......... 428/332; 428/336; 428/694 TS; 428/900; 427/128; 427/129; 427/130; 204/192.2

[58] Field of Search .......... 428/694 TS, 332, 428/336; 427/128–130; 204/192.2

[56] References Cited

U.S. PATENT DOCUMENTS

| | | | |
|---|---|---|---|
| 5,846,648 | 12/1998 | Chen | 428/332 |
| 5,858,566 | 1/1999 | Zhang | 428/694 TS |
| 5,879,783 | 3/1999 | Chang | 428/141 |
| 6,010,795 | 1/2000 | Chen | 428/611 |

OTHER PUBLICATIONS

"NiA1 Underlayers for CoCrTa Magnetic Thin Films", L. Lee, et al., IEEE Transactions On Magnetics, vol. 30, No. 6, Nov. 1994, pp. 3951–3953.

"The Role of NiA1 Underlayers in Longitudinal Recording Media" (abstract), C. Ross, et al., Journal of Applied Physics, vol. 81, No. 8, Apr. 15, 1997. p. 4369.

*Primary Examiner*—Leszek Kiliman

*Attorney, Agent, or Firm*—McDermott, Will & Emery

[57] ABSTRACT

A magnetic recording medium exhibiting high remanent coercivity and low noise is produced by depositing a first NiAl seedlayer on a non-magnetic substrate, e.g., glass, ceramic or glass-ceramic material, at a relatively low temperature, and subsequently depositing a second NiAl seedlayer on the first seedlayer at a relatively higher temperature. Embodiments include depositing a first NiAl seedlayer at a temperature less than about 120° C., e.g., less than about 100° C., and depositing a second NiAl seedlayer thereon at a temperature greater than about 200° C., e.g. greater than about 230° C. Embodiments also include depositing a Cr-alloy underlayer, CrV, on the second seedlayer.

18 Claims, 5 Drawing Sheets

MAGNETIC RECORDING MEDIUM WITH LOW TEMPERATURE SEEDLAYER FOR HIGH SIGNAL-TO-NOISE RATIO

RELATED APPLICATIONS

This application claims priority from Provisional Application Ser. No. 60/069,574 filed Dec. 12, 1997, now abandoned, entitled "LOW TEMPERATURE NiAl SEEDLAYER PROCESS FOR HIGHER SIGNAL-TO-NOISE RATIO GLASS MEDIA", the entire disclosure of which is hereby incorporated herein by reference.

TECHNICAL FIELD

The present invention relates to magnetic recording media, such as thin film magnetic recording disks, and to a method of manufacturing the media. The invention has particular applicability to high areal density magnetic recording media exhibiting low noise and high remanent coercivity.

BACKGROUND ART

The requirements for increasingly high areal recording density impose increasingly greater demands on thin film magnetic recording media in terms of remanent coercivity (Hr), magnetic remanance (Mr), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the coercivity of the magnetic recording medium. However, this objective can only be accomplished by decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10 of a glass, ceramic or glass-ceramic materials. There are typically sequentially sputter deposited on each side of substrate 10 adhesion enhancement layer 11, 11', e.g., Cr or a Cr alloy, a seedlayer 12, 12', such as nickel-phosphorus (NiP), an underlayer 13, 13', such as Cr or a Cr alloy, a magnetic layer 14, 14', such as a cobalt (Co)-based alloy, and an overcoat 15, 15', such as a carbon-containing overcoat. Typically, although not shown for illustrative convenience, a lubricant topcoat is applied on the protective overcoat 15, 15'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is recognized that underlayers having a fine grain structure are highly desirable, particular for growing fine grains of hexagonal close packed (HCP) Co alloys deposited thereon.

It has been reported that nickel-aluminum (NiAl) films exhibit a grain size which is smaller than similarly deposited Cr films which are the underlayer of choice in conventional magnetic recording media. Li-Lien Lee et al., "NiAl Underlayers For CoCrTa Magnetic Thin Films", IEEE Transactions on Magnetics, Vol. 30, No. 6, pp. 3951–3953, 1994.

Accordingly, NiAl thin films are potential candidates as underlayers for magnetic recording media for high density longitudinal magnetic recording. However, it was found that the coercivity of a magnetic recording medium comprising an NiAl underlayer is too low for high density recording, e.g. about 2,000 Oersteds (Oe). The use of an NiAl underlayer is also disclosed by C. A. Ross et al., "The Role Of An NiAl Underlayers In Longitudinal Thin Film Media" and J. Appl. Phys. 81(a), P.4369, 1997.

Conventional practices in manufacturing magnetic recording media comprise Direct Current (DC) magnetron sputtering and high temperatures in order to obtain Cr segregation in Co-alloy grain boundaries to achieve high Hr and high SNR. However, low temperature DC magnetron sputtering techniques can only produce low Hr and low SNR media with NiAl seedlayers and Cr-alloy underlayers.

The demands for increasingly high areal recording density create a need for magnetic recording media exhibiting high Hr and high SNR, particularly in media containing an NiAl seedlayer and a Cr-alloy underlayer.

DISCLOSURE OF THE INVENTION

An advantage of the present invention is a magnetic recording medium for high areal recording density exhibiting low noise and high Hr.

Another advantage of the present invention is a method of manufacturing a magnetic recording medium for high areal recording density exhibiting low noise and high Hr.

Additional advantages and other features of the invention will be set forth in part in the description which follows and in part will become apparent to those having ordinary skill in the art upon examination of the following only to be learned from the practice of the invention. The advantages of the invention may be realized and obtained as particularly pointed out in the appended claims.

According to the present invention, the foregoing and other advantages are achieved by a magnetic recording medium comprising a non-magnetic substrate; a first seedlayer on the non-magnetic substrate; a second seedlayer on the first seedlayer; and a magnetic layer on the second seedlayer.

Another aspect of the present invention is a magnetic recording medium comprising: a glass, ceramic or glass-ceramic substrate; a first NiAl seedlayer on the non-magnetic substrate deposited at a temperature less than about 120° C.; a second NiAl seedlayer deposited on the first NiAl seedlayer at a temperature not less than about 200° C.; and a magnetic layer on the second NiAl seedlayer.

A further aspect of the present invention is a method of manufacturing a magnetic recording medium, the method comprising depositing a first seedlayer on a non-magnetic substrate at a first temperature; depositing a second seedlayer at a second temperature, greater than the first temperature, on the first seedlayer; and depositing a magnetic layer on the second seedlayer.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, and not as restrictive.

DESCRIPTION OF THE INVENTION

Figure 1:
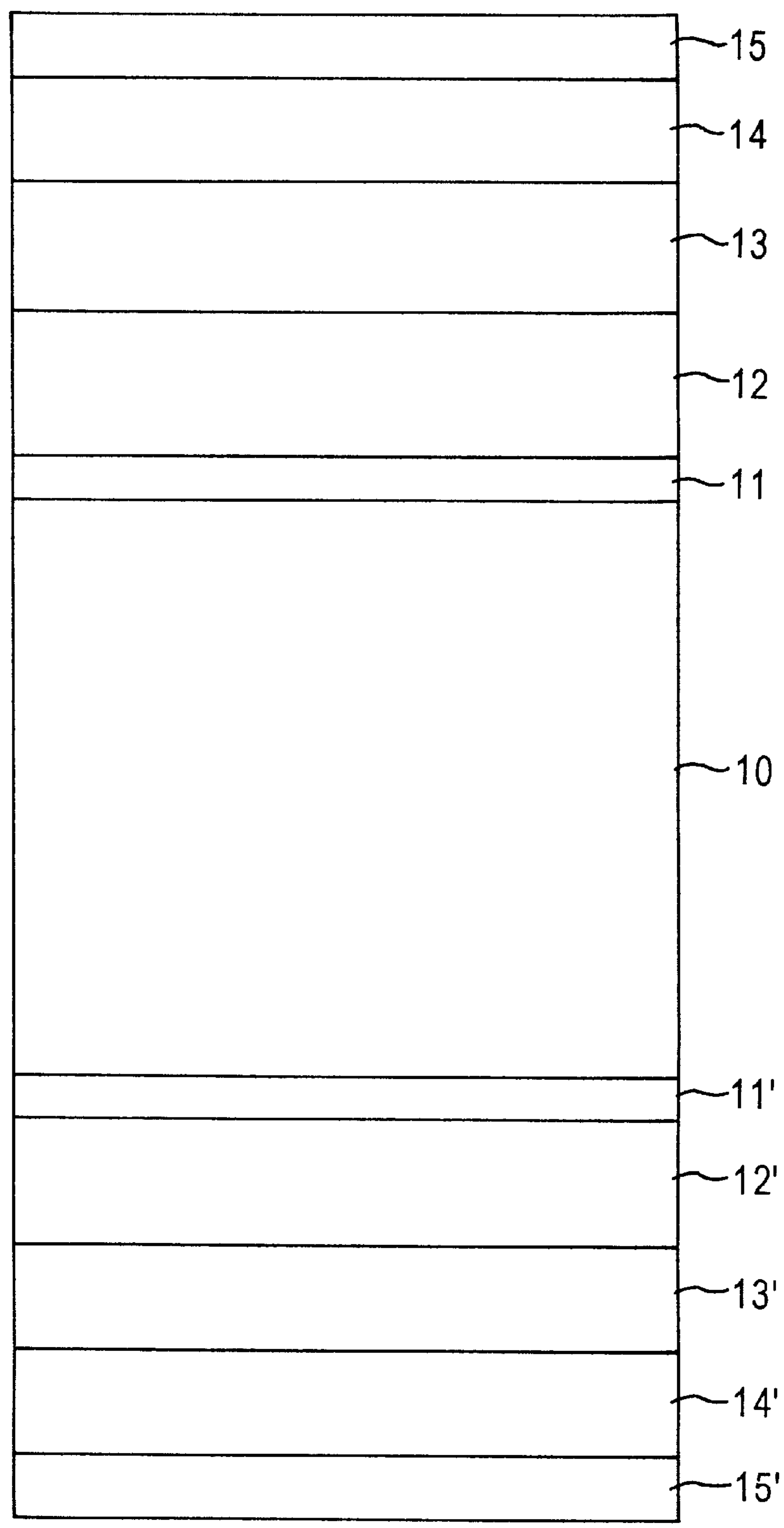
FIG. 1 schematically depicts a conventional magnetic recording medium structure.

The present invention provides magnetic recording media suitable for high areal recording density exhibiting high Hr and high SNR. The present invention is particularly applicable to magnetic recording media containing an NiAl seedlayer and Cr-alloy underlayer thereon, which seedlayer and underlayer have been sputter deposited at relatively high temperatures. In accordance with embodiments of the present invention, a desirably high Hr and high SNR are achieved by the strategic deposition of a first seedlayer on a substrate at a relatively low temperature, e.g. at a temperature less than about 120° C. A second seedlayer is then deposited on the first seedlayer at a relatively high temperature, e.g. greater than about 200° C. Subsequent processing, parallels conventional practices and typically involves sequentially sputter depositing an underlayer, e.g. Cr-containing underlayer, such as a Cr-alloy, e.g. chromium vanadium (CrV), a magnetic layer, such as a Co-based alloy layer, and a protective overcoat, such as a carbon-containing protective overcoat, at temperatures above the temperature at which the first seedlayer was deposited, e.g., greater than about 200° C. A lubricant topcoat is typically deposited on the protective overcoat. As in conventional practices, magnetic recording media in accordance with the present invention can comprise an adhesion promoting layer, such as Cr or a Cr alloy, on the non-magnetic substrate.

The first and second seedlayers deposited in accordance with embodiments of the present invention can each comprise an NiAl alloy, e.g., an NiAl alloy contain about 41 to about 55 atomic percent of Al and the balance Ni. In accordance with embodiments of the present invention, the first NiAl seedlayer is deposited at a relatively low temperature in order to restrict its grain size. In embodiments of the present invention, the first seedlayer is characterized by a microstructure with a grain size smaller than the grain size of the second seedlayer. A widely used method to characterize the grain size is TEM (transmission electron microscopy) with a plane view of the film. The grain image of the TEM plane view has a circular-like shape. The diameter of the circles is considered the grain diameter. The grains of the first seedlayer typically have an average diameter no greater than about 150 Å.

The first seedlayer can be deposited by DC magnetron sputtering at a temperature of about 20° C. to about 120° C., e.g., about 50° C. to about 100° C., and at a pressure of about 5 to about 15 mTorr, e.g. about 7.5 to about 10 mTorr. Each of the first and second NiAl seedlayers typically has a thickness of about 100 Å to about 2500 Å. The second NiAl seedlayer in accordance with embodiments of the present invention can be deposited at a temperature of about 200° C. to about 300° C., e.g. 230° C. to about 260° C., and at a pressure of about 5 to about 15 mTorr, e.g. about 7.5 to about 10 mTorr.

As the first seedlayer is deposited at relatively low temperature, it exhibits a smaller grain size than that of the seedlayer deposited thereon at a higher temperature. The smaller grain size of the first seedlayer enables a reduction in the grain size of layers subsequently deposited thereon below that which would occur in the absence of the first seedlayer deposited at a low temperature. Consequently, the subsequently deposited seedlayer, underlayer and magnetic layers each have a desirably reduced grain size. By controlling the grain size of the magnetic layer, the medium noise is significantly reduced. Moreover, the deposition of a first NiAl seedlayer at a low temperature on surfaces of a glass substrate provides a coating before heating to an elevated temperature which significantly reduces the emissivity of the glass substrate and, hence, maintains a high substrate temperature during magnetic film deposition, thereby further enhancing Hr and reducing medium noise.

Figure 2:
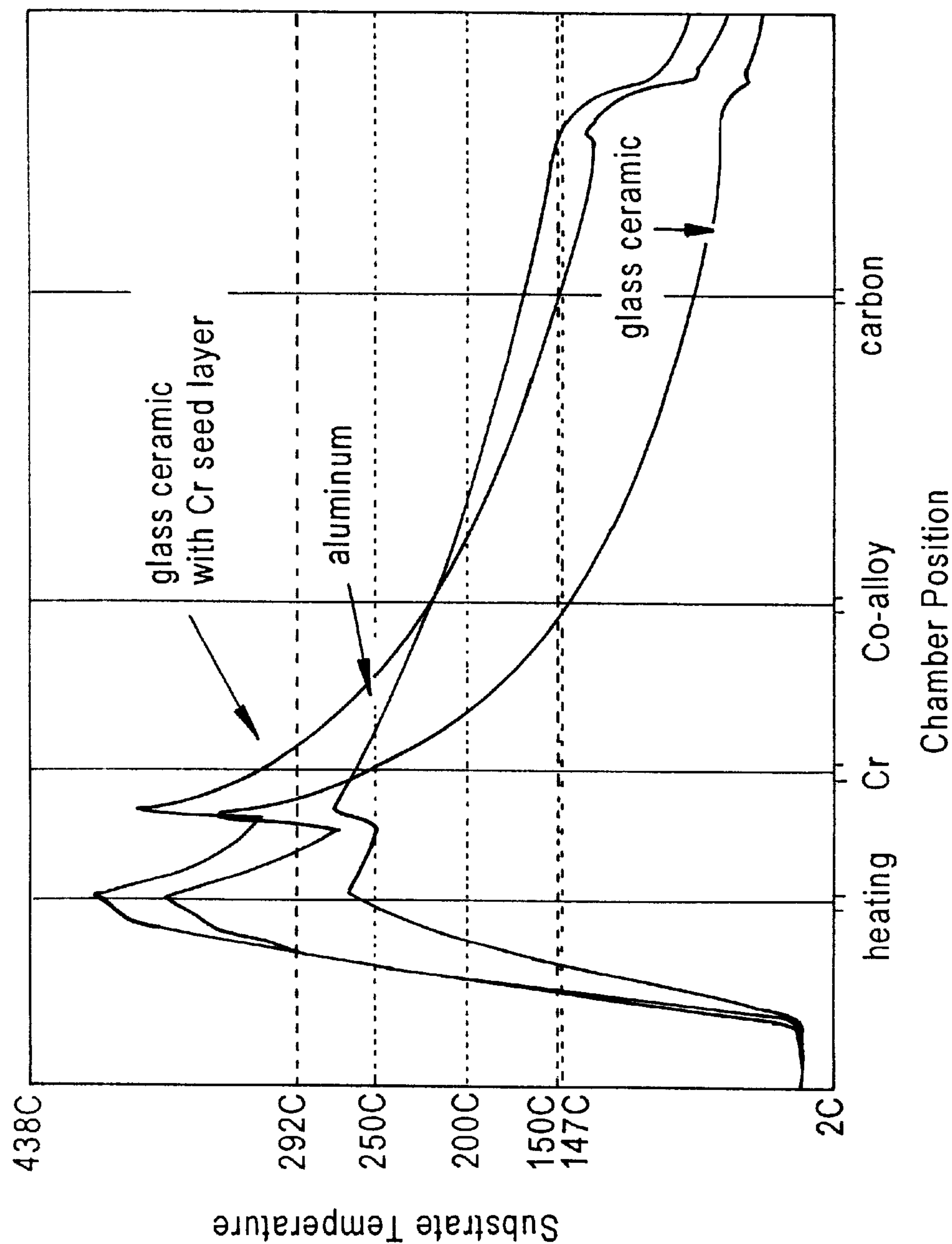
FIG. 2 is a graph showing the temperature profile of Al and glass-ceramic substrates and a glass-ceramic substrate with a Cr seedlayer.

FIG. 2 demonstrates the temperature profiles of three types of substrates in a pass-by in-line sputtering system measured with embedded thermocouples. All three types of substrates were heated under identical conditions. The sputter power was not turned on. Two heaters were located at the positions corresponding to the two peaks of the temperature profile of each substrate. The Cr seedlayer was deposited before the substrates entered the heating station. The emissivity of pure glass-ceramic substrates was so high that the temperature dropped very rapidly. The emissivity of the glass-ceramic substrates coated with a Cr seedlayer is significantly reduced, and high temperature Co-alloy deposition is achieved.

Figure 3:
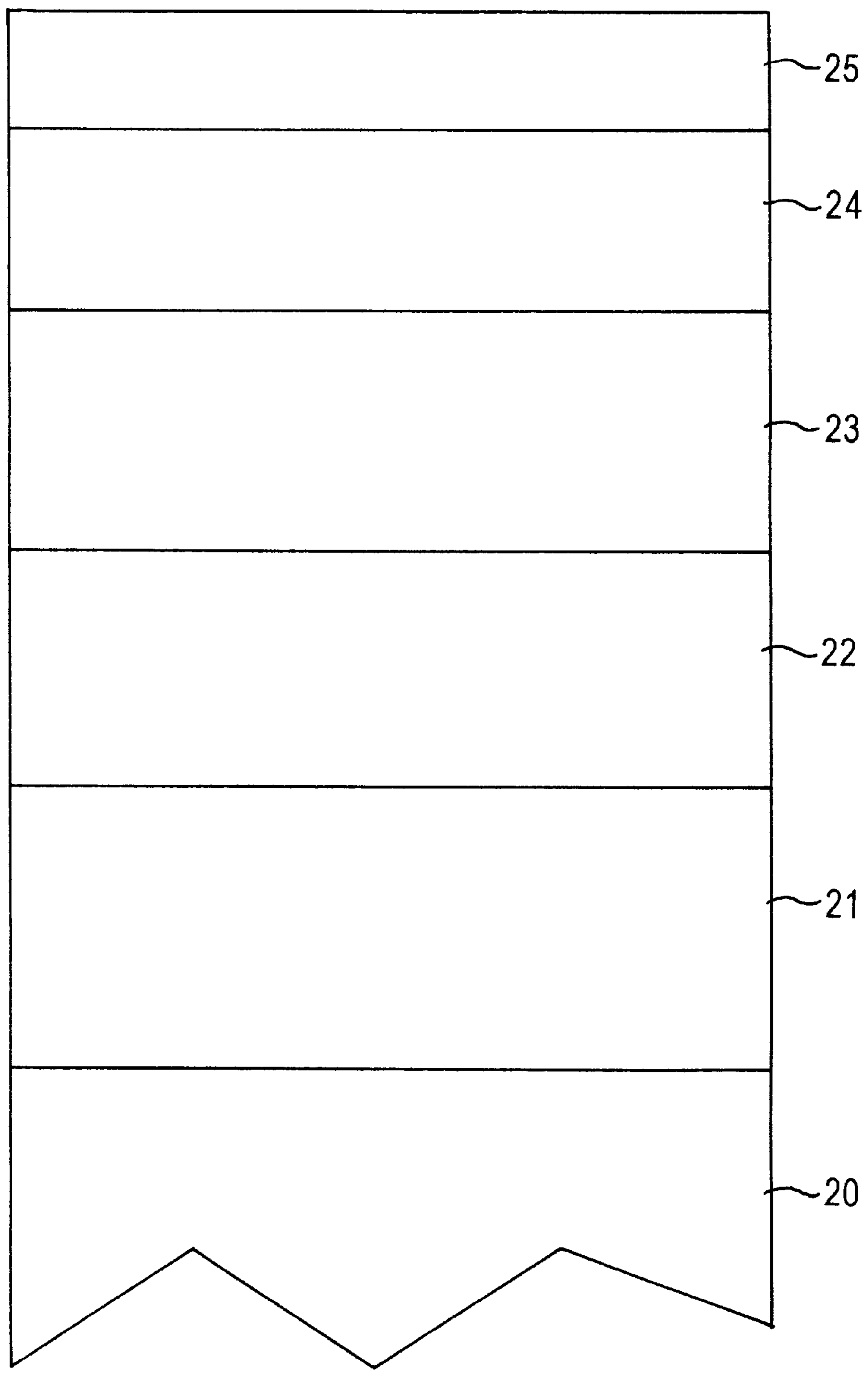
FIG. 3 schematically depicts a magnetic recording medium structure in accordance with an embodiment of the present invention.

An embodiment of the present invention is illustrated in FIG. 3. For illustrative convenience, the sequentially deposited layers are shown only on one side of substrate 20. However, it is understood that the present invention comprises sputter depositing sequential layers on both sides of substrate 20, as in FIG. 1.

Adverting to FIG. 3, a first NiAl seedlayer 21 is deposited on glass substrate 20 at a relatively low temperature, such as below about 100° C. A second NiAl seedlayer 22 is deposited on first NiAl seedlayer 21 at a relatively high temperature, such as above about 200° C. Underlayer 23, such as a Cr alloy, e.g. CrV, is deposited on second NiAl seedlayer 22. Magnetic layer 24, such as a Co-based alloy, is deposited on underlayer 23, and a protective overcoat 25, such as a carbon-containing overcoat is deposited on magnetic alloy layer 24. Although not shown, the present invention also comprises a conventional lubricant topcoat on the protective overcoat 25. Layers 21, 22, 23, 24 and 25 are deposited by DC magnetron sputtering techniques.

Figure 4:
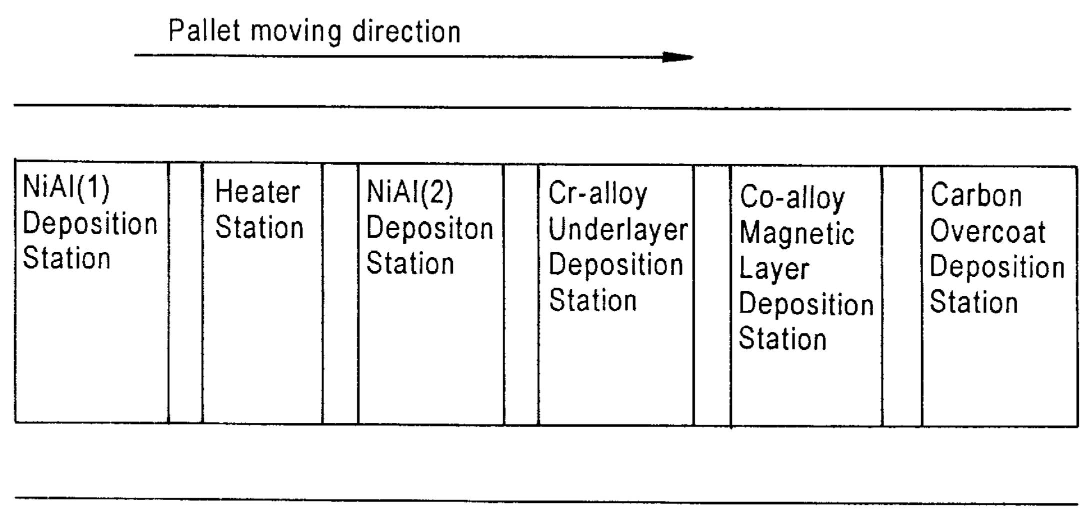
FIG. 4 schematically illustrates a sputtering system for use in the present invention.

Adverting to FIG. 4, a sputtering system for implementation for the present invention is illustrated. After first depositing NiAl seedlayer [NiAl (1)], on substrate 20, the substrate is passed into a heating station. Subsequently, second NiAl seedlayer [NiAl (2)], Cr-alloy underlayer, Co-alloy magnetic layer and carbon overcoat 24 are sequentially sputter deposited at a high substrate temperature, e.g. about 280° C., in sequentially arranged deposition stations. Another heating station can be installed in the system at the upstream location for heating the substrate to a low temperature before sputter depositing the NiAl (1).

EXAMPLES

Figure 5:
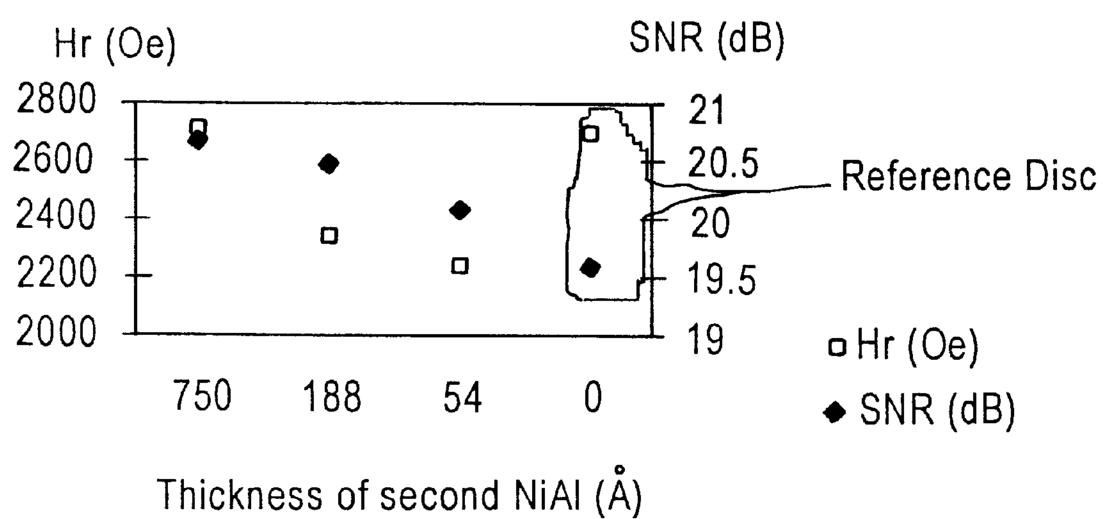
FIG. 5 is a graph comparing the SNR of the present invention vis-à-vis a conventional medium.

Media were prepared with and without a low temperature seedlayer, employing glass-ceramic substrates. The media were prepared by DC magnetron sputtering of the seedlayers, underlayers and magnetic layer. The product of Mr and thickness of magnetic layers (Mrt) of the media was about 0.74 to about 0.79 memu/cm$^2$. The medium without the low temperature seedlayer or reference disk comprised an NiP seedlayer, CrV underlayer, Co14%Cr4%Ta intermediate layer and magnetic layer of Co15%Cr8%Pt4%Ta (all percentages representing atomic percentages). The medium in accordance with the present invention comprised a first low temperature Ni50%Al seedlayer, a second Ni50%Al seedlayer, a Cr20%V underlayer, and a magnetic layer comprising Co15%Cr9.5%Pt4%Ta. The heating time and heating power for both media were identical. The SNR and Hr of each medium was measured. The SNR was measured with a magnetoresistive (MR) head at a frequency of about 250 kiloflux changes per inch (KFCI). The results are reported in FIG. 5 and clearly show that the SNR of the medium in accordance with the present invention comprising a low temperature NiAl layer is significantly greater than that of the reference disk without the low temperature seedlayer.

Magnetic recording media were prepared with and without a low temperature NiAl seedlayer on conventional glass substrates. All layers were deposited by DC magnetron sputtering in a pass-by in-line sputtering system. The magnetic properties were measured and are reported in Table I below. The SNR was measured with a MR head at 250 KFCI. PW50 denotes pulse width at half maximum, and BER denotes bit error rate. It is apparent from the reported results that the medium containing a low temperature NiAl seedlayer exhibits a significantly higher SNR, lower BER and narrower PW50, than the medium without the low temperature NiAl seedlayer.

TABLE I

| Hr (Oe) | Mrt (memu/cm$^2$) | PW50 ($\mu$") | SNR (dB) | BER (log) | Film structure |
|---|---|---|---|---|---|
| 2587 | 0.84 | 10.2 | 19.6 | −7.4 | NiAl (2)/CrV/Co15% Cr9.5% Pt4% Ta |
| 2535 | 0.81 | 10.2 | 19.8 | −7.4 | " |
| 2708 | 0.85 | 10.2 | 19 | −7.6 | " |
| 2645 | 0.84 | 10.1 | 19.3 | −6.9 | " |
| 2580 | 0.81 | 10.1 | 18.7 | −6.5 | " |
| 2711 | 0.74 | 9.1 | 20.7 | −8.1 | NiAl (1)/NiAl (2)/CrV/Co15% Cr9.5% Pt4% Ta |
| 2525 | 0.74 | 9.2 | 20.6 | −8.9 | " |
| 2707 | 0.78 | 10 | 19.6 | −6.7 | Cr/NiP/CrV/Co14% Cr4% Ta/Co15% Cr8% Pt4% Ta |

In further testing, two media comprising NiAl/CrV/Co15%Cr18%Pt4%Ta layers were prepared by depositing the layers employing DC magnetron sputtering and heating under identical power and for an identical period of time. A low temperature NiAl (1) seedlayer was initially deposited in preparing one of the media. The seedlayer and underlayer thicknesses and magnetic properties are set forth in Table II below.

TABLE II

| NiAl (1) (Å) | NiAl (2) (Å) | CrV (Å) | Hr (Oe) | Mrt (memu/cm$^2$) |
|---|---|---|---|---|
| 1068 | 1068 | 330 | 2657 | 0.76 |
| None | 2136 | 330 | 2457 | 0.85 |

It is apparent from the data reported in Table II above that a higher Hr is achieved with a medium in accordance with the present invention containing a low temperature NiAl (1) seedlayer vis-à-vis a medium with a NiAl seedlayer having an identical thickness to the thickness of the NiAl seedlayers and an identical thickness of the CrV underlayer of the medium in accordance with the present invention.

Accordingly, the present invention enables the production of magnetic recording media exhibiting high remanent coercivity and low noise by initially depositing a first seedlayer at relatively low temperature and subsequently depositing a second seedlayer at a relatively high temperature. The present invention is not limited to the specific examples disclosed herein, or to the particular materials previously exemplified or mentioned. The magnetic recording media of the present invention are not limited to any particular type of substrate material, underlayer, magnetic layer, or protective overcoat or lubricant topcoat. The magnetic recording media of the present invention enjoy utility and various applications, particularly applications wherein high density is required.

Only certain embodiments of the invention and but a few examples of its versatility are shown and described in the present disclosure. It is to be understood that the present invention is capable of use in various other combinations and environments and is capable of changes and modifications within the scope of the inventive concept as expressed herein.

What is claimed is:

1. A magnetic recording medium comprising:

a non-magnetic substrate;

a first seedlayer on the non-magnetic substrate;

a second seedlayer on the first seedlayer; and a magnetic layer on the second seedlayer; wherein: the first and second seedlayer each comprises NiAl containing about 41 to about 55 at. % Al; and the first seedlayer was deposited at a lower temperature than the second seedlayer.

2. The magnetic recording medium according to claim 1, wherein the first seedlayer was deposited at a temperature less than about 120° C., and the second seedlayer was deposited at a temperature greater than about 200° C.

3. The magnetic recording medium, according to claim 1, wherein each of the first and second seedlayers has a thickness of about 100 Å to about 2500 Å.

4. The magnetic recording medium, according to claim 1, wherein the first seedlayer has a grain size less than that of the second seedlayer.

5. The magnetic recording medium according to claim 1, wherein the first seedlayer has a microstructure comprising grains having an average diameter no greater than about 150 Å.

6. The magnetic recording medium, according to claim 1, further comprising an underlayer between the second seedlayer and the magnetic layer.

7. The magnetic recording medium, according to claim 6, wherein the underlayer comprises a Cr or a Cr alloy.

8. The magnetic recording medium, according to claim 7, wherein the underlayer comprises CrV.

9. The magnetic recording medium, according to claim 1, wherein the non-magnetic substrate comprises a glass, ceramic or glass-ceramic material.

10. A method of manufacturing a magnetic recording medium, the method comprising:

depositing a first seedlayer on a non-magnetic substrate at a first temperature;

depositing a second seedlayer at a second temperature, greater than the first temperature, on the first seedlayer; and depositing a magnetic layer on the second seedlayer; wherein each of the first and second seedlayers comprises NiAl containing about 41 to about 55 at. % Al.

11. The method according to claim 10, comprising:

sputter depositing the first seedlayer at a temperature not greater than about 120° C.;

sputter depositing the second seedlayer at a temperature not less than about 200° C.

12. The method according to claim 11, comprising:

sputter depositing the first seedlayer at a temperature of about 50° C. to 100° C.; and sputter depositing the second seedlayer at a temperature of about 230° C. to about 260° C.

13. The method according to claim 10, further comprising depositing an underlayer on the second seedlayer and depositing the magnetic layer on the underlayer.

14. The method according to claim 13, wherein the underlayer comprises Cr or a Cr alloy.

15. The method according to claim 10, wherein the substrate comprises a glass, ceramic or glass-ceramic material.

16. The method according to claim 10, wherein each of the first and second seedlayers has a thickness of about 100 Å to 2500 Å.

17. The method according to claim 10, wherein the first seedlayer has a grain size less than that of the second seedlayer.

18. The method according to claim 17, wherein the first seedlayer has a microstructure comprising grains having an average diameter no greater than about 150 Å.

* * * * *